US006936238B2

(12) United States Patent
Sennoun et al.

(10) Patent No.: US 6,936,238 B2
(45) Date of Patent: Aug. 30, 2005

(54) COMPACT PARTIAL OXIDATION/STEAM REACTOR WITH INTEGRATED AIR PREHEATER, FUEL AND WATER VAPORIZER

(75) Inventors: Mohammed E. H. Sennoun, Rochester, NY (US); William H. Pettit, Rochester, NY (US); Rodney L. Borup, Los Alamos, NM (US); Gerald E. Voecks, Fairport, NY (US)

(73) Assignee: General Motors Corporation, Detroit, MI (US)

( * ) Notice: Subject to any disclaimer, the term of this patent is extended or adjusted under 35 U.S.C. 154(b) by 274 days.

(21) Appl. No.: 10/236,828

(22) Filed: Sep. 6, 2002

(65) Prior Publication Data

US 2004/0047800 A1 Mar. 11, 2004

(51) Int. Cl.[7] .................................................. C01B 3/26
(52) U.S. Cl. ........................ 423/652; 422/190; 422/198; 422/211
(58) Field of Search ................................ 422/190, 198, 422/211; 423/652

(56) References Cited

U.S. PATENT DOCUMENTS

| | | | |
|---|---|---|---|
| 4,293,315 A | 10/1981 | Sederquist | |
| 4,642,272 A | 2/1987 | Sederquist | |
| 4,650,727 A | 3/1987 | Vanderborgh et al. | |
| 4,659,634 A | 4/1987 | Struthers | |
| 4,670,359 A | 6/1987 | Beshty et al. | |
| 4,816,353 A | 3/1989 | Wertheim et al. | |
| 5,271,916 A | 12/1993 | Vanderborgh et al. | |
| 5,518,705 A | 5/1996 | Buswell et al. | |
| 6,126,908 A | 10/2000 | Clawson et al. | |
| 6,238,815 B1 * | 5/2001 | Skala et al. | |
| 6,521,204 B1 * | 2/2003 | Borup et al. | |
| 2003/0200699 A1 * | 10/2003 | Robb | 48/198.7 |

FOREIGN PATENT DOCUMENTS

| | | | |
|---|---|---|---|
| DE | 3912003 A1 * | 10/1989 | |
| DE | 19727841 A1 * | 1/1999 | |
| DE | 10127199 A1 * | 2/2002 | |
| EP | 214432 A1 * | 3/1987 | |
| EP | 242199 B1 * | 10/1987 | |
| EP | 330751 A2 * | 9/1989 | |
| EP | 0 710 996 | 1/1995 | |
| EP | 1277698 A2 * | 1/2003 | |
| WO | WO 01/32302 A1 * | 5/2001 | |
| WO | WO 01/94005 A1 * | 12/2001 | |

* cited by examiner

*Primary Examiner*—Stanley S. Silverman
*Assistant Examiner*—Maribel Medina
(74) *Attorney, Agent, or Firm*—Harness, Dickey & Pierce, P.L.C.

(57) ABSTRACT

A compact autothermal (partial oxidation and steam reforming) fuel reactor is provided for implementation with a fuel cell system. The reactor includes a premixing chamber for premixing a volume of air, steam and fuel into an effluent, a thermal POX reactor, a first stage reforming segment, a post-premix chamber, and a second stage reforming segment. Further provided are a water/fuel vaporizer for supplying steam and fuel as a gas to the premix chamber and an airflow cavity disposed about the reactor for pre-heating air supplied to the premix chamber. The thermal POX segment operates during an initial start-up period for pre-heating the other components of the reactor. Once the other components achieve an operation temperature, the first and second stage reforming segments catalytically reform the effluent. The premix and post-premix chambers enable variance in the O/C and S/C ratios to be achieved as the effluent is reformed through the multiple stages.

23 Claims, 6 Drawing Sheets

COMPACT PARTIAL OXIDATION/STEAM REACTOR WITH INTEGRATED AIR PREHEATER, FUEL AND WATER VAPORIZER

FIELD OF THE INVENTION

The present invention relates to fuel cell systems and more particularly to an improved autothermal reactor of a fuel cell system.

BACKGROUND OF THE INVENTION

Fuel cells have been proposed as a power source for a variety of applications including electrical vehicular power plants replacing internal combustion engines. In proton exchange membrane (PEM) type fuel cells, hydrogen is supplied to an anode of the fuel cell and oxygen is supplied as an oxidant to a cathode of the fuel cell. PEM fuel cells include a membrane electrode assembly (MEA) comprising a thin, proton transmissive, non-electrically conductive, solid polymer membrane-electrolyte having the anode on one of its faces and the cathode on the opposite face. The MEA is sandwiched between a pair of electrically conductive elements which serve as current collectors for the anode and cathode and contain appropriate channels and/or openings therein for distribution of the fuel cell's gaseous reactants over the surfaces of the respective anode and cathode catalysts. A typical PEM fuel cell and its MEA are described in commonly assigned U.S. Pat. Nos. 5,272,017 and 5,316,817, to Swathirajan et al. A plurality of individual fuel cells are commonly stacked together to form a PEM fuel cell stack.

In PEM fuel cells, hydrogen ($H_2$) is implemented as the anode reactant and oxygen ($O_2$) is implemented as the cathode reactant. The oxygen can be supplied in either a pure form or as air (a mixture primarily composing $O_2$ and $N_2$). For vehicular applications, it is desirable to use a liquid fuel, such as methanol ($CH_3OH$), gasoline, diesel and the like, as the source of hydrogen for the fuel cell. Such liquid fuels are preferred for onboard storage and a national and international infrastructure exists for supplying such liquid fuels. However, such liquid fuels must be dissociated for releasing the hydrogen content thereof. The dissociation reaction is generally accomplished in an autothermal reactor. A conventional, exemplary process is a steam/methanol reformation process where methanol and water (steam) are ideally reacted to generate hydrogen and carbon dioxide according to the reaction: $CH_3OH+H_2O \rightarrow CO_2+3H_2$.

For automotive applications, the electrical energy provided by the fuel cell is ultimately converted to mechanical energy for vehicle propulsion. In this case, a circuit comprises the fuel cell and an electric motor constructed and arranged to accept electric energy from the fuel cell and convert the electrical energy to mechanical energy through the electric motor. A battery is arranged as part of the circuit to accept and store electric energy supplied by the fuel cell and to provide electric energy to the electric motor. Finally, a driving axle is constructed and arranged to rotate wheels of the vehicle, as driven by the electric motor. In such a dynamic fuel cell system, the flow rate of the reformate stream (i.e. hydrogen-rich fuel stream) varies with the load demands put upon the fuel cell system.

As a result of their bulk and thermal inefficiencies, prior art fuel processing methods, such as those described in commonly assigned, co-pending U.S. patent application Ser. Nos. 08/975,442 and 08/980,087 to Pettit and 09/187,125 to Skala et al; and U.S. Pat. No. 4,650,722 to Vanderborgh, are not optimal for implementation with a vehicular application. More particularly, the prior art systems are inefficient with respect to both energy and space. For example, several prior art systems implement external heat sources for generating heat required for start-up of the autothermal reactor, as well as vaporizing fuel and water, and thus are thermally inefficient. Further, prior art systems generally provide fuel and air vaporizers as separate components which require additional packaging space within a vehicle.

Therefore, it is desirable in the industry to provide a fuel processing system that is compact for easy integration into a vehicle application, and is capable of handling transient load requirements, particularly at start-up. Further, the fuel processor should have increased efficiency through improved thermal management and be inexpensive to produce.

SUMMARY OF THE INVENTION

Accordingly, the present invention provides an autothermal reactor for reforming a hydrocarbon fuel stream into a reformate stream including hydrogen. The autothermal reactor includes a first stage autothermal reformer for incorporating thermal partial oxidation and a second stage autothermal reformer. The autothermal reactor includes a premix chamber for mixing the hydrocarbon fuel stream with at least one of air and steam for producing a first pre-reformate stream, a first stage for partially reforming the first pre-reformate stream into a second pre-reformate stream. The first stage is in fluid communication with the premix chamber. A post-premix chamber mixes the second pre-reformate stream with at least one of air, steam and fuel vapor. The post-premix chamber is in fluid communication with the first stage and with a second stage for further reforming the second pre-reformate stream into the reformate stream. The second stage is in fluid communication with the post-premix chamber and in heat exchange communication with the first stage. In operation, the first stage initially reacts a fuel and air stream for enabling quick start-up of the autothermal reactor and producing heat for heating the first and second reforming stages to establish an operational temperature thereof.

The first stage includes a thermal partial oxidation sector and a first catalytic autothermal reactor in fluid communication with the thermal partial oxidation sector. Within the first stage, the exothermic reactions associated with catalytic partial oxidation consume oxygen and dissociate the majority of the inlet hydrocarbon feed. The second stage includes a second catalytic autothermal reactor which enhances the endothermic steam reaction with the hydrocarbon exiting the first stage. Initially, the thermal partial oxidation sector thermally reacts the fuel and air stream injected therein by fuel and air injectors for producing the heat for heating the first and second stages during such events as start-up.

The premix chamber of the autothermal reactor includes a mixing chamber in fluid communication with an air source, a plurality of radially disposed fuel vapor injectors in fluid communication with the mixing chamber, a plurality of radially disposed steam injectors in fluid communication with the mixing chamber and a grid disposed within the mixing chamber having a plurality of premix injection holes. Air flows through the grid to mix with fuel and steam provided by the injectors for producing the first pre-reformate stream and further provide the first pre-reformate stream to the first stage.

Further, the autothermal reactor includes an outer shell having a passage therethrough, in fluid communication with the premix chamber and in heat exchange communication with the first stage, wherein the air travels through the passage from the air source for preheating the air prior to entering the premix chamber.

The autothermal reactor of the present invention also includes a vaporizer in fluid communication with the premix chamber and in heat exchange communication with the reformate stream exiting the second stage, whereby heat from the reformate stream enables operation of the vaporizer to vaporize fuel and water to be supplied to the premix chamber through the fuel vapor and steam injectors.

Further areas of applicability of the present invention will become apparent from the detailed description provided hereinafter. It should be understood that the detailed description and specific examples, while indicating the preferred embodiment of the invention, are intended for purposes of illustration only and are not intended to limited the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
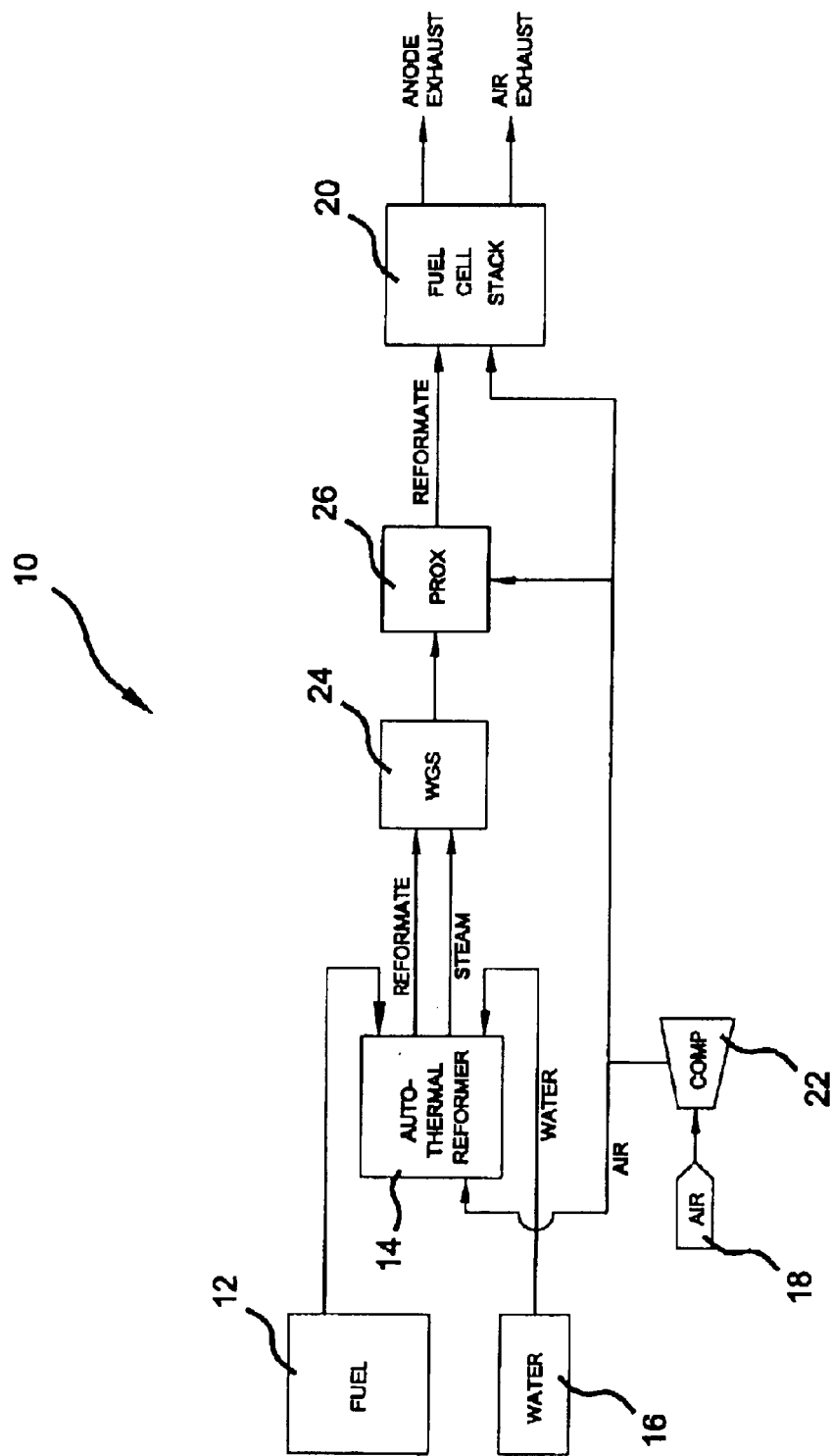
FIG. 1 is a schematic view of a fuel cell system including an autothermal reactor in accordance with the principles of the present invention.
Figure 2:
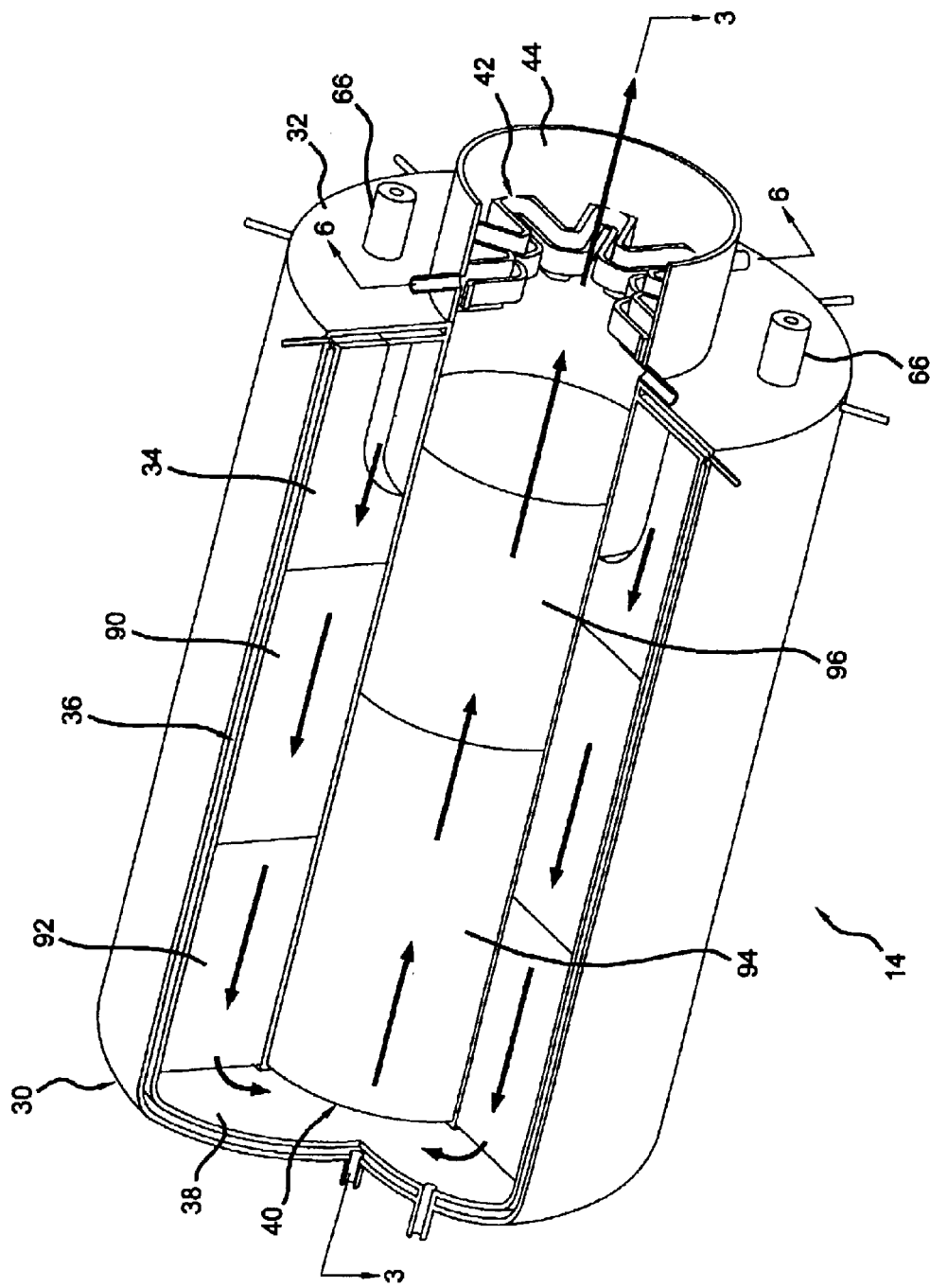
FIG. 2 is a perspective, partial-sectional view of the autothermal reactor.
Figure 3:
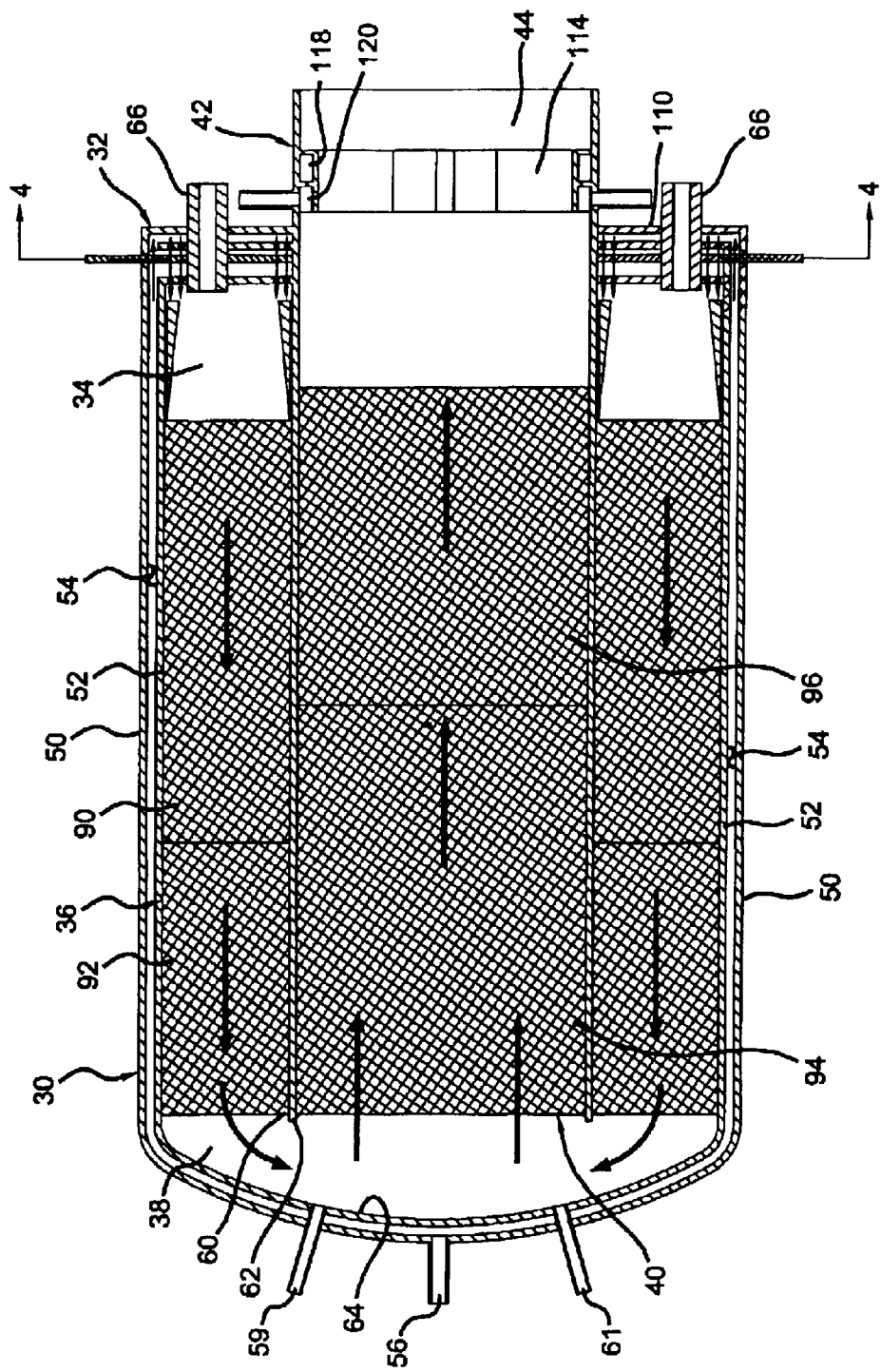
FIG. 3 is a schematic cross-sectional view along line 3—3 of FIG. 2 of the autothermal reactor.

With reference to FIG. 1, an exemplary fuel cell system 10 is shown. The system 10 includes a fuel tank 12 for supplying a hydrocarbon fuel, such as, but not limited to methanol ($CH_3OH$) or gasoline (mixture of paraffins, olefins and aromatics), to an autothermal reactor 14 constructed in accordance with the principles of the present invention. Further, a water tank 16 and an air source 18 are also included for respectively providing water and air to the autothermal reactor 14. Air is further supplied to a fuel cell stack 20, as described in further detail hereinbelow, and is driven through the system by a compressor 22.

The autothermal reactor 14 dissociates the hydrocarbon fuel using steam and air that react with the hydrocarbon fuel for producing a hydrogen-rich reformate. For example, in a gasoline reformation process, gasoline, air and water (as steam) are ideally reacted to generate hydrogen and carbon dioxide according to the following reaction: $C_xH_y + xH_2O \rightarrow xCO + (y/2+x)H_2$. However, the autothermal reactor 14 actually yields a reformate gas comprising hydrogen, carbon monoxide, carbon dioxide and water. The carbon monoxide content of the reformate stream is generally too high for direct use in the fuel cell stack 20, where the result is fouling of the anode of the fuel cell stack 20. Therefore, the produced reformate stream flows to a water-gas-shift (WGS) reactor 24 and further into a preferential oxidation (PROX) reactor 26 for reducing the carbon monoxide content to an acceptable level.

Within the WGS reactor 24, water (as steam) is added to the reformate provided from the autothermal reactor 14 in the presence of a suitable catalyst, thereby lowering its temperature and increasing the steam to carbon ratio therein. The steam is provided from the autothermal reactor 14, as discussed in detail below. A higher steam to carbon ratio serves to lower the carbon monoxide content of the reformate according to the following ideal reaction: $CO + H_2O \rightarrow CO_2 + H_2$. In this manner, the amount of carbon monoxide is reduced. However, not enough for the reformate stream to be safe for use in the PEM fuel cell stack 20.

The PROX reactor 26 is provided for further reducing the carbon monoxide content to an acceptable level for use in the fuel cell stack 20. The reformate stream exiting the WGS reactor 24 enters the PROX reactor 26 where it is catalytically reacted with oxygen, supplied in the form of air from the air source 18, according to the following reaction: $CO + \frac{1}{2}O_2 \rightarrow CO_2$. The reformate stream then flows from the PROX reactor 26 to the fuel cell stack 20 for generating electric energy.

With particular reference to FIGS. 2 through 6, the autothermal reactor 14 of the present invention includes a cylindrical housing 30 for containing a premix chamber 32, a thermal partial oxidization (POX) segment 34, a first stage reforming segment 36, a post-premix chamber 38, a second stage reforming segment 40, a combined water/fuel vaporizer 42 and a reformate stream outlet 44. The combined water/fuel vaporizer 42 respectively receives water and fuel from the water and fuel tanks 12,16 and vaporizes each, as described in further detail hereinbelow. The water and fuel vapor are directed from the combined vaporizer 42 to the premix chamber 32. Also, water vapor (steam) is channeled to the WGS reactor 24. Preferably, water, fuel vapor and air are channeled to the post-premix chamber 38. Within the premix chamber 32 water (steam) and fuel are mixed with air from the air source 18. After an initial period of a thermal POX reaction (i.e. start-up), described in further detail below, the air/fuel/water effluent from the premix chamber 32 is directed through the first stage reforming segment 36 where it is partially reformed and directed into the post-premix chamber 38. Additional fuel, water or air, or any combination thereof, is added to the partially reformed effluent, which is then directed through the second stage reforming segment 40 to completely reform the mixture, thereby producing the reformate stream. The reformate stream flows through the vaporizer 42 and exits from the autothermal reactor 14 through the outlet 44.

The cylindrical housing 30 includes an outer shell 50 and an inner shell 52, between which is formed an annular cavity 54. The cavity 54 is accessible through a first inlet 56, which is in fluid communication with the air source 18. Additional inlets 59 and 61 are provided to supply any combination of fuel, air and steam. Preferably, inlet 59 is constructed as a fuel injector and inlet 61 is constructed as an air and/or steam injector. Preferably, inlet 56 is constructed as an air injector. Further, the cavity 54 is in fluid communication with the premix chamber 32, whereby air flows from the air source 18, through the inlet 56, through the cavity 54 and into the premix chamber 32. While travelling through the cavity 54, the air is in heat exchange relationship with the inner shell 52. In this manner, as the inner shell 52 is caused to heat up as a result of operation of the autothermal reactor 14, as described in detail below, the air is pre-heated for mixing within the premix chamber 32. Generally, the air achieves a temperature of about 600° C. or more for use within the auto-thermal reactor 14. Further, the housing 30 is preferably enclosed in a layer or several layers of insulating material (not shown), enabling the autothermal reactor 14 to be more energy effective.

The premix chamber 32 is disposed at an end of the cylindrical housing 30. The thermal POX segment 34, first stage reforming segment 36, post-premix chamber 38 and second stage reforming segment 40 are disposed within the inner shell 52. The thermal POX and first stage reforming segments 34,36 are generally cylindrical in shape having a centrally disposed annular cavity 60 running therethrough. The second stage reforming segment 40 is cylindrical in shape and disposed within the centrally disposed cavity 60 of the thermal POX and first stage reforming segments 34,36. A cylindrically shaped separator 62 separates the thermal POX and first stage reforming segments 34,36 from the second stage reforming segment 40 and provides a heat exchange relationship therebetween. The thermal POX segment 34, first stage reforming segment 36 and second stage reforming segment 40 run through a portion of the inner shell 52, from the premix chamber end, coming short of a back face 64, thereby defining the post-premix chamber 38.

The thermal POX segment 34 is in fluid communication with liquid fuel and air injectors 66 that run through the premix chamber 32 into direct fluid communication with the thermal POX segment 34. For start-up, liquid fuel and air are injected into the thermal POX segment 34 where they are ignited for producing a partial oxidation reaction. This process is exothermic and generates a significant amount of heat used for heating the other components of the autothermal reactor 14. Generally, the first and second stage reforming segments 36,40 must achieve a temperature of at least 400° C. in order to operate normally. As mentioned above, the period of time during which the thermal POX segment 34 operates is designated as start-up. The hot product gases resulting from the start-up period, flow through the first stage reforming segment 36, the post-premix segment 38, the second stage reforming segment 40, the vaporizer 42 and out the outlet 44. Air travelling through the cavity 54 of the housing 30 is preheated by the heat generated from the POX reaction as the heat is transferred through the inner shell 52.

It is further anticipated that a transient temperature control element (not shown) may be optionally disposed between the thermal POX segment 34 and the first stage reforming segment 36. The transient temperature control element has appropriate dimensions to affect a desired temperature reduction of the gas exiting the thermal POX segment 34 and control transient temperature changes during start-up. The transient temperature control element further includes an appropriate thermal mass to perform the temperature reduction function over a sufficient amount of time to allow the first and second reforming segments 36,40 to heat to their light-off temperatures without sudden exposure to high temperature effluents from the thermal POX segment 34.

Figure 4:
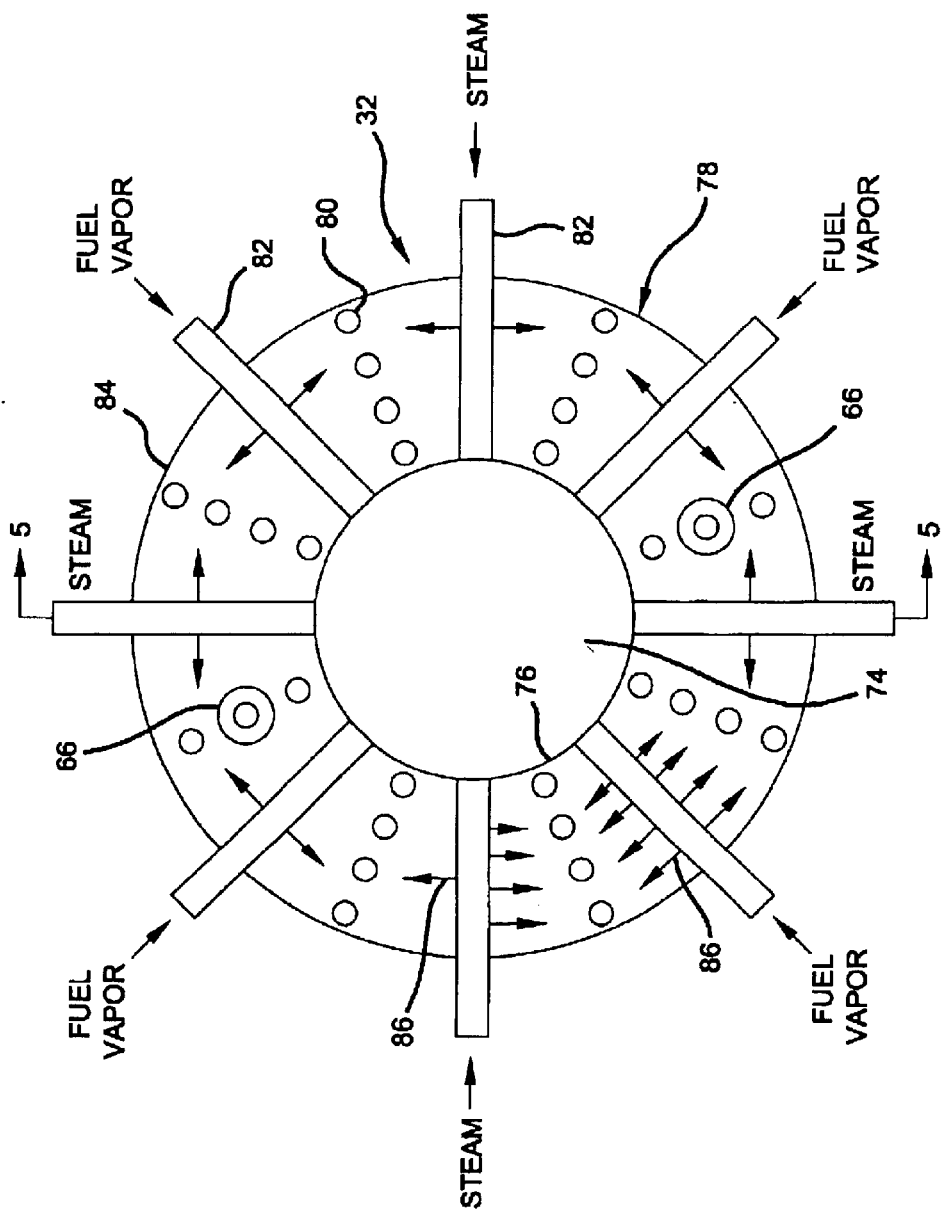
FIG. 4 is a schematic cross-sectional view along the line 4—4 of FIG. 3 of a premix chamber of the autothermal reactor.
Figure 5:
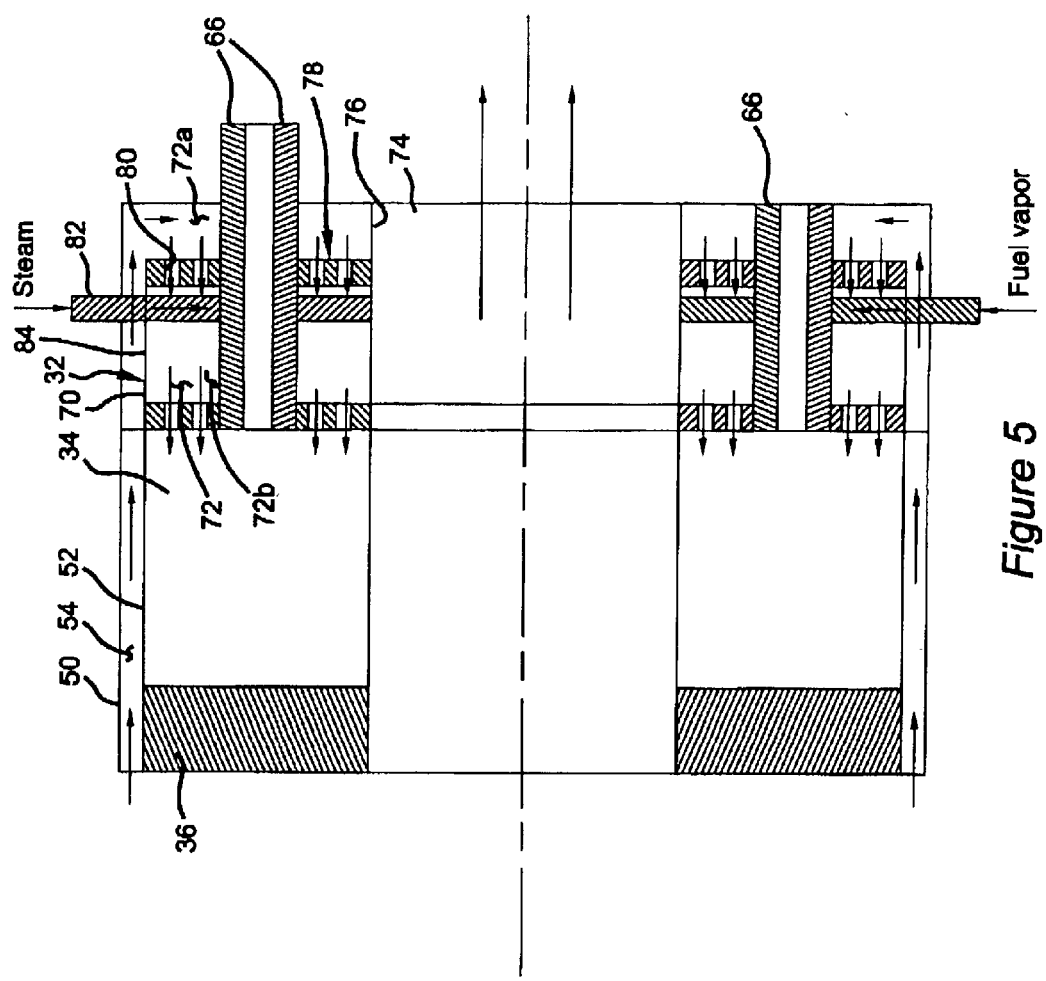
FIG. 5 is a cross-sectional view along the line 5—5 of FIG. 4 of the premix chamber of the autothermal reactor.
Figure 6:
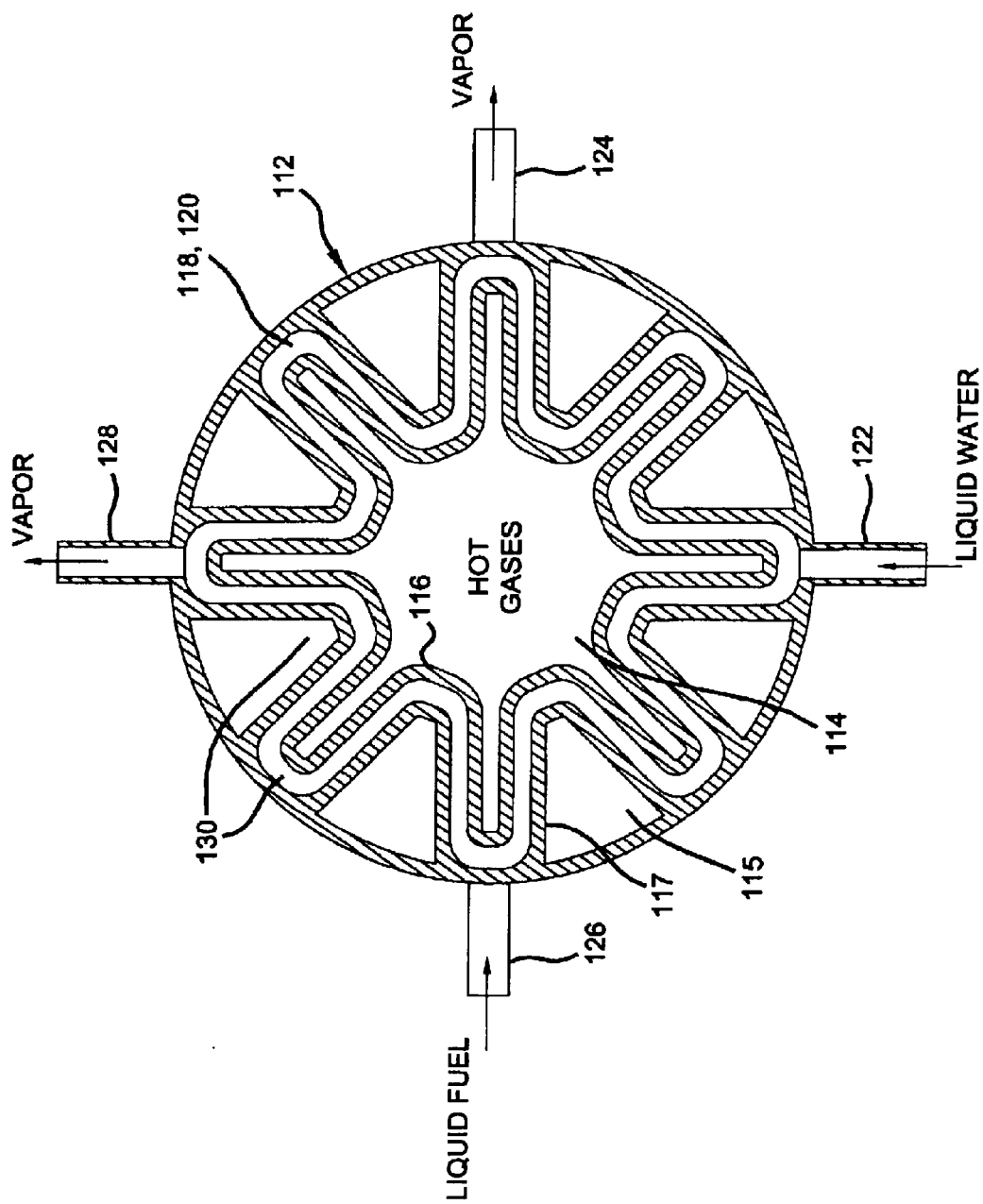
FIG. 6 is a cross-sectional view along line 6—6 of FIG. 2 of a fuel and water vaporizer of the autothermal reactor.

During normal operation of the autothermal reactor 14, the air, fuel and water (steam) effluent is directed from the premix chamber 32 through the thermal POX segment 34 for reformation through the remaining segments containing catalyst beds. With particular reference to FIGS. 4 and 5, the premix chamber 32 will be described in detail. The premix chamber 32 includes a disc-shaped housing 70 defining a cavity 72 therein and having a central aperture 74 running longitudinally therethrough, a circumferential surface 76 of which defines a portion of the outlet 44. A disc-shaped grid 78 is intermediately disposed within the cavity 72 and divides the cavity into first and second chambers 72a,72b. The disc-shaped grid 78 includes a plurality of radially aligned premix injection holes 80. The cavity 54 of the housing 30 is in fluid communication with the first chamber 72a, whereby preheated air is supplied to the premix chamber 32. A series of fuel vapor and water (as steam) inlets 82 are radially disposed through an outer circumferential wall 84 of the premix chamber 32 and are each in fluid communication with the second chamber 72b of the cavity 72 through a series of ports 86. The fuel and steam inlets 82 are alternatively disposed about the circumference, thereby providing better mixing as a result of multiple impingement regions.

The first and second stage reforming segments 36,40 generally provide catalytic partial oxidation (CPO) and steam reforming (SR) reactions. It should be understood that there is overlap between the reactions occurring, whereby the CPO reaction implies predominately a reaction between fuel and air and the SR reaction implies predominately a reaction between fuel and water. The invention is described herein with reference to these reactions. However, it is to be understood that since fuel, water (as steam) and air are added together, the CPO and SR combined perform the autothermal reforming process. In the CPO reaction, the fuel reacts exothermally with a sub-stoichiometric amount of air to produce carbon monoxide, hydrogen and lower molecular weight hydrocarbons. The CPO reaction is generally fuel-rich. The CPO reaction products, as well as steam introduced therein, are endothermically reacted in the SR reaction where the lower hydrocarbons react with the steam to produce additional $H_2$, CO and $CO_2$ in the reformate gas. The reformate gas generally comprises carbon dioxide, carbon monoxide, hydrogen, nitrogen, water and methane. The heat generated by the exothermic CPO reaction is utilized in the SR reaction, as well as for pre-heating the air in the cavity 54, as described hereinabove.

The first stage reforming segment 36 includes a CPO section 90 and an SR section 92. The CPO section 90 includes a preferred CPO catalyst comprising one or more noble metals, which may include, but are not limited to, Pt, Rh, Pd, Ir, Os, Au, and Ru. Further, other non-noble metals, or combination of metals, such as Ni and Co, may be implemented therein. The SR section 92 includes an SR catalyst typically comprising a noble metal and/or non-noble metal, similarly as described above for the CPO section. Similarly, the second stage reforming segment 40 preferably includes a CPO section 94 together with an SR section 96 for further reforming the effluent leaving the post-premix chamber 38, as described in further detail hereinbelow.

The design described herein provides for integral combination of reaction heat and temperatures associated with these reactions that results in the compact, efficient autothermal reactor 14. The exothermic CPO reaction, taking place in the first stage reforming segment 36, generates heat within the catalyst bed and is transferred into the gas stream which exits it. This heat is transferred to the second stage reforming segment 40 for the steam reforming (SR) reaction. The endothermic SR reaction requires heat to complete the reformation reaction with any of the following or combination thereof: (1) the simple hydrocarbons which have not been converted in the CPO reactions, and (2) additional fuel and steam, which can be injected into the post-premix chamber 38. The steam may be superheated via passage through the combined vaporizer 42 to enhance the SR reaction. The temperature at the CPO entrance section (roughly the first ⅓ of the length) is relatively high, on the order of 600° C. This zone of high temperature, which is coincident with the SR exit, assists bringing the SR reaction of hydrocarbons more nearly to completion. The addition of fuel and steam, as well as air in some instances, is a function of the particular autothermal reactor's performance requirements. If steam is only needed to augment the steam originally provided to the first stage reforming segment 36, only steam needs to be added. If the temperature and heat at the outlet 44 of the second stage reforming segment 40 are adequate, additional steam and fuel may be added into the post-premix chamber 38 to increase the total hydrogen production. If additional heat is required to convert the added feed fuel, some air may be added with the steam and fuel to oxidize some fuel, or hydrogen and carbon monoxide generated in the first stage reforming segment 36 to convert the additional fuel added with steam. If adequate steam is available from the first stage reforming segment 36 to convert more fuel, additional feed fuel may be added with or without additional air. It is evident that any one or more of fuel, steam and air are supplied to post-premix chamber 38, depending on the requirements and optimization of the reforming reaction. The autothermal reactor 14, as described herein, is flexible and able to be operated according to a variety of strategies including but not limited to those described above.

In order to reduce the need for external heat exchangers, within which the SR effluent is cooled, the incoming fuel, air and steam are preheated at the outlet 44 of autothermal reformer 14. This method of heat transfer to the incoming reactants provides the preheat necessary for the CPO section 90 to sustain its activation temperature over a wide turn-down. The combined temperature and thermal profiles of the three functions (reactant preheat, CPO, and SR) can be synchronized by incorporating them as shown in FIG. 5. In order to optimize the thermal efficiency and minimize the possibility of carbon formation from hydrocarbon fuels and methane slippage from the SR, the dimensions of each segment can be altered to accommodate wide ranges of operating throughput. Parameters that can be altered include the annular CPO section 90 external diameter, catalyst bed thickness and length of the first stage reforming section 36, the catalyst bed diameter and length of the second stage reforming section 40 (part of which is dependent upon the first stage reforming section catalyst bed dimensions), the relative lengths of the catalyst beds for the CPO section 90,94 and SR section 92,96 in the first and second stage reforming sections 36,40, respectively, the inlet reactant premix heat exchanger section shape and length. Other parameters that can be altered to further improve the efficiency and compactness of the autothermal reactor 14 include the catalyst choices and catalyst loadings to match activities with the heat and temperature demands. By integrating the SR section 96 in the center of the reactor, where temperature and thermal profiles can be controlled independently by the addition of fuel and steam into the stage two SR section 96, and the oxygen to carbon ratio of the CPO, a more versatile and efficient autothermal reactor 14 is possible.

The water/fuel vaporizer 42 is mounted on an outer face 110 of the premix chamber 32 and includes a ring structure 112 forming a central aperture 114 and radial apertures 115. The reformate stream leaving the outlet 44 flows through the central and radial apertures 114,115 and is in heat exchange relationship with an inner wall 116 of the central aperture 114 and walls 117 of the radial apertures 115. Internally, first and second channels 118,120, respectively, are defined and run about the ring structure 112. The first channel 118 is in fluid communication with a first inlet 122 and a first outlet 124. Similarly, the second channel 120 is in fluid communication with a second inlet 126 and a second outlet 128. In this manner, water and fuel can be concurrently supplied to the autothermal reactor 14 through the water/fuel vaporizer 42, without mixing. In general, water and fuel respectively flow from the fuel and water tanks 12,16 into either the first and second inlets 122,126. The hot reformate stream leaving the outlet 44 sufficiently heats the inner wall 116 and walls 115 of the water/fuel vaporizer 42, whereby the liquid water and fuel entering are vaporized into gaseous form and supplied to the ports 86 of the premix chamber 32 through the first and second outlets 124,128. Concurrently, the temperature of the reformate stream is reduced for further downstream processing, as described above. Further, the first and second outlets 124,128 of the water/fuel vaporizer 42 are in fluid communication with the post-premix chamber 38 for enabling a second stage of mixing with a partially treated effluent, as described in further detail below. Steam required by the WGS reactor and for the supplemental addition into the post-premix chamber 38 is also supplied from the water/fuel vaporizer 42.

The ring structure 112 is presently shown as a generally star-shaped structure having several curves 130 forming radially extending arms. In this manner, the surface area of the inner wall 116 is maximized as well as forming walls 115, thereby enabling sufficient heat exchange communication with the exiting reformate stream. Thus, the fuel and water are completely vaporized into gaseous form. It will be appreciated, however, that although the present form of the ring structure 112 is a preferred embodiment, the ring structure 112 may take any one of several forms, as particular designs may require.

In operation, the autothermal reactor 14 is initially operated during a start-up period, until achieving a sufficient temperature and switching to normal operation. During the start-up period, liquid fuel and air are injected through the fuel/air injector, into the thermal POX segment 34, where they are ignited in a significantly exothermic reaction. The reformate product of this reaction flows through the other segments of the autothermal reactor 14 and out the outlet 44. The temperature of this reformate product serves to heat the catalyst beds of the first and second stage reforming segments 36,40, as well as the water/fuel vaporizer 42. Upon achieving a normal operational temperature (e.g. about 400° C.), the autothermal reactor 14 switches to normal operation, whereby water and fuel are supplied to the vaporizer 42, are vaporized into gaseous form and are supplied to the premix chamber 32. Within the premix chamber 32, the fuel and steam are mixed with preheated air supplied through the cavity 54 to form an effluent. This effluent is then supplied from the premix chamber 32, through the injection holes 80 to the first stage reforming segment 36, bypassing any reaction within the thermal POX segment 34. This effluent includes a first oxygen to carbon (O/C) ratio and a first steam to carbon (S/C) ratio.

The effluent is catalytically reacted in the CPO and SR sections 90,92 of the first stage reforming segment 36 and the resulting partially treated effluent flows to the post-premix chamber 38. At this point, the O/C and S/C ratios of the partially treated effluent have changed as a result of the reformation through the first stage reforming segment 36 and are most likely not at a desirable level for efficient reformation. Thus, while in the post-premix chamber 38, the partially treated effluent is optionally mixed with one, or a combination, of air, water (steam) and fuel. In this manner, a second O/C ratio and a second S/C ratio may be achieved for optimal reformation within the second stage reforming segment 40. After remixing in the post-premix chamber 38, the effluent flows through the CPO and SR sections 94,96 of the second stage reforming segment 40 where it is catalytically reformed into the end-product reformate, exiting out the outlet 44, as described above.

The autothermal reactor 14 of the present invention provides a compact, efficient device for reforming a hydrogen-based fuel. The water/fuel vaporizer 42 absolves the need for external water and fuel vaporizers that would require heating from an external source and further packaging space within a vehicle. Further, the multi-stage construction enables modification of the O/C and S/C ratios as the fuel is reformed, resulting in a better quality reformate product. The construction of the autothermal reactor 14 enables overall efficiency by providing heat exchange relation between the various components, thereby enabling pre-heating, vaporizing, etc. without requiring an additional heating source. Finally, the thermal POX segment 34 enables the autothermal reactor 14 to handle transient power requirements, as well as heating the other components for normal operation.

As a note, exemplary reaction temperatures of the processes can be found in the literature and, by way of background, are provided here as a leaching tool. The autothermal reactions are conducted at a temperature of about 600° C. to 1000° C. The WGS reaction is preferably conducted in two shifts, a high temperature shift at a temperature between 300 and 600° C. and a low temperature shift at a temperature below 300° C. The PROX reaction is preferably conducted at a temperature below the low temperature shift and the PEM fuel cell stack reaction even lower, at a suitable temperature for the delicate MEA components.

In accordance with the present embodiment of the present invention, the second stage reforming segment 40 is encircled by the thermal POX segment 34 and first stage reforming segment 36. Although this configuration is preferred, it is anticipated that alternative configurations are possible including the thermal POX segment 34 and first stage reforming segment 36 being centrally positioned and encircled by the second stage reforming segment 36. It is also anticipated that such an alternative configuration would require a correspondingly reconfigured premix chamber 32 and vaporizer 42, a detailed description of which is foregone.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of operating an autothermal reactor for reforming a hydrocarbon fuel into a hydrogen-rich reformate stream, comprising the steps of:
    operating a thermal partial oxidation reactor of the autothermal reactor for a first period for thermally reforming the fuel and generating heat;
    heating components of the autothermal reactor during said first period;
    switching to a second period after said components achieve an operational temperature;
    premixing the hydrocarbon fuel stream with at least one of air and steam for producing a mixed reactant stream;
    reforming said mixed reactant stream in a first stage catalytic reformer of the autothermal reactor for producing an effluent stream;
    reforming said effluent stream in a second stage catalytic reformer of the auto-thermal reactor for producing the reformate stream; and
    simultaneously transferring heat between components of the autothermal reactor for maintaining operational temperatures thereof during said second period.

2. The method of claim 1, further comprising the step of post-premixing said effluent stream with at least one of air, fuel and steam prior to reformation in said second stage catalytic reformer.

3. The method of claim 1, further comprising the steps of providing a catalytic partial oxidization section and a catalytic steam reforming section for comprising said first stage reformer.

4. The method of claim 1, further comprising the steps of providing a catalytic partial oxidization section and a catalytic steam reforming section for comprising said second stage reformer.

5. The method of claim 1, further comprising the steps of:
    providing an outer shell having a passage therethrough that is in heat exchange communication with said components of the autothermal reactor;
    preheating air flowing through said passage with heat generated during either of said first and second periods.

6. The method of claim 1, further comprising the steps of:
    providing a vaporizer in heat exchange communication with the reformate stream exiting said second stage reformer;
    heating said vaporizer with heat from the reformate stream; and
    vaporizing at least one of fuel and water within said vaporizer to be supplied to the autothermal reactor.

7. The method of claim 6, wherein said vaporizer is further in heat exchange communication with said thermal partial oxidation reactor and the reformate stream.

8. The method of claim 1, comprising the step of providing a premix chamber for premixing the hydrocarbon fuel stream with at least one of air and steam for producing said mixed reactant stream.

9. The method of claim 8, further comprising the steps of:
    providing a mixing chamber in fluid communication with an air source;
    providing a plurality of radially disposed fuel vapor injectors in fluid communication with said mixing chamber;
    providing a plurality of radially disposed steam injectors in fluid communication with said mixing chamber; and
    providing a grid disposed within said mixing chamber having a plurality of premix injection holes.

10. The method of claim 1, wherein said mixed reactant stream has a first oxygen to carbon ratio and said effluent stream has a second oxygen to carbon ratio.

11. The method of claim 1, wherein the mixed reactant stream has a first steam to carbon ratio and said effluent stream has a second steam to carbon ratio.

12. An autothermal reactor for reforming a hydrocarbon fuel stream into a hydrogen-rich reformate stream, the autothermal reactor comprising:
    a premix chamber for mixing the hydrocarbon fuel stream with at least one of air and steam for producing a mixed reactant stream;
    a first stage catalytic reformer for partially reforming said mixed reactant stream into an effluent stream, said first stage catalytic reformer in fluid communication with an outlet of said premix chamber;
    a post-premix chamber for mixing said effluent stream with at least one of air, steam and fuel vapor, said post-premix chamber in fluid communication with an outlet of said first stage catalytic reformer; and a second stage catalytic reformer for further reforming said effluent stream to form the reformate stream, said second stage catalytic reformer in fluid communication with an outlet of said post-premix chamber and nested within said first stage catalytic reformer in heat exchange communication with said first stage catalytic reformer; and a thermal reactor for combusting the hydrocarbon fuel with air to form a combustion stream during a start-up period prior to supplying the hydrocarbon fuel stream and said at least one of air and steam to said premix chamber, said thermal reactor having an outlet for supplying said combustion stream to said first and second stage catalytic reformers for heating said first and second stage catalytic reformers to establish a normal operational temperature thereof.

13. The autothermal reactor of claim 12, wherein said first stage catalytic reformer comprises one of a catalytic partial oxidization section and a catalytic steam reforming section.

14. The autothermal reactor of claim 12, wherein said second stage catalytic reformer comprises one of a catalytic partial oxidization section and a catalytic steam reforming section.

15. The autothermal reactor of claim 12, wherein endothermic components of said first stage catalytic reformer are in heat exchange relation with exothermic components of said second stage catalytic reformer.

16. The autothermal reactor of claim 12, wherein endothermic components of said second stage catalytic reformer are in heat exchange relation with exothermic components of said first stage catalytic reformer.

17. The autothermal reactor of claim 12, further comprising a vaporizer in fluid communication with said premix chamber and heat exchange communication with said reformate stream exiting said second stage catalytic reformer, whereby heat from said reformate stream enables said vaporizer to vaporize at least one of said fuel and water to be supplied to said premix chamber.

18. The autothermal reactor of claim 12, further comprising a transient temperature control element disposed between said thermal reformer and said first stage catalytic reformer.

19. An autothermal reactor for reforming a hydrocarbon fuel stream into a hydrogen-rich reformate stream, the autothermal reactor comprising:

a premix chamber for mixing the hydrocarbon fuel stream with at least one of air and steam for producing a mixed reactant stream;

a first stage catalytic reformer for partially reforming said mixed reactant stream into an effluent stream, said first stage catalytic reformer in fluid communication with an outlet of said premix chamber;

a post-premix chamber for mixing said effluent stream with at least one of air, steam and fuel vapor, said post-premix chamber in fluid communication with an outlet of said first stage catalytic reformer;

a second stage catalytic reformer for further reforming said effluent stream to form the reformate stream, said second stage catalytic reformer in fluid communication with an outlet of said post-premix chamber and in heat exchange communication with said first stage catalytic reformer;

a thermal reactor for combusting the hydrocarbon fuel with air to form a combustion stream during a start-up period prior to supplying the hydrocarbon fuel stream and said at least one of air and steam to said premix chamber, said thermal reactor having an outlet for supplying said combustion stream to said first and second stage catalytic reformers for heating said first and second stage catalytic reformers to establish a normal operational temperature thereof; and an outer shell having a passage therethrough that is in fluid communication with said premix chamber and in heat exchange communication with other components of the autothermal reactor.

20. The autothermal reactor of claim 19, wherein a flow of air travels through said passage whereby said air is preheated prior to entering said premix chamber.

21. An autothermal reactor for reforming a hydrocarbon fuel stream into a hydrogen-rich reformate stream, the autothermal reactor comprising:

a premix chamber for mixing the hydrocarbon fuel stream with at least one of air and steam for producing a mixed reactant stream wherein said premix chamber includes a mixing chamber in fluid communication with an air source, a plurality of radially disposed fuel vapor injectors in fluid communication with said mixing chamber, a plurality of radially disposed steam injectors in fluid communication with said mixing chamber, a grid disposed within said mixing chamber having a plurality of premix injection holes, whereby air flows through said grid to mix with fuel and steam provided by said injectors for producing said first effluent;

a first stage catalytic reformer for partially reforming said mixed reactant stream into an effluent stream, said first stage catalytic reformer in fluid communication with an outlet of said premix chamber;

a post-premix chamber for mixing said effluent stream with at least one of air, steam and fuel vapor, said post-premix chamber in fluid communication with an outlet of said first stage catalytic reformer;

a second stage catalytic reformer for further reforming said effluent stream to form the reformate stream, said second stage catalytic reformer in fluid communication with an outlet of said post-premix chamber and in heat exchange communication with said first stage catalytic reformer;

a thermal reactor for combusting the hydrocarbon fuel with air to form a combustion stream during a start-up period prior to supplying the hydrocarbon fuel stream and said at least one of air and steam to said premix chamber, said thermal reactor having an outlet for supplying said combustion stream to said first and second stage catalytic reformers for heating said first and second stage catalytic reformers to establish a normal operational temperature thereof.

22. The autothermal reactor of claim 21, further comprising an outer shell having a passage therethrough, in fluid communication with said premix chamber and in heat exchange communication with other components of the autothermal reactor, wherein a flow of air travels through said passage and is pre-heated prior to entering said premix chamber.

23. The autothermal reactor of claim 21, further comprising a vaporizer in fluid communication with said premix chamber and heat exchange communication with said reformate stream exiting said second stage catalytic reformer, whereby heat from said reformate stream enables operation of said vaporizer to vaporize at least one of fuel and water to be supplied to said premix chamber through said fuel vapor and steam injectors.

* * * * *